United States Patent

[11] 3,562,474

| [72] | Inventors | Robert F. Sellmann<br>9534 N. 60th St., Milwaukee, 53223;<br>William A. Sellmann, 11421 N. Parkview<br>Drive, Mequon, Wis. 53092 |
|---|---|---|
| [21] | Appl. No. | 676,132 |
| [22] | Filed | Oct. 18, 1967 |
| [45] | Patented | Feb. 9, 1971 |

[54] ARRANGEMENT FOR MAINTAINING PARALLELISM BETWEEN RELATIVELY MOVABLE MEMBERS OF AN ELECTRICAL DISCHARGE MACHINING APPARATUS
5 Claims, 7 Drawing Figs.

[52] U.S. Cl. .................................................. 219/69, 100/288
[51] Int. Cl. .................................................. B23b 1/08, B30b 1/24
[50] Field of Search ........................................ 219/69(D), 69(E), 69(M), 69(G); 100/288

[56] References Cited
UNITED STATES PATENTS

| 2,622,511 | 12/1952 | Marsico et al. | 100/288X |
| 2,712,157 | 7/1955 | Holte | 100/288X |
| 2,981,822 | 4/1961 | Larkins | 219/69(P) |
| 3,120,601 | 2/1964 | Berlin et al. | 219/69(E) |
| 3,154,664 | 10/1964 | Zeder | 219/69(M) |
| 3,366,770 | 1/1968 | Blatt et al. | 219/69(G) |

*Primary Examiner*—R. F. Staubly
*Attorneys*—John W. Michael, Gerrit D. Foster, Bayard H. Michael, Paul R. Puerner, Joseph A. Gemignani, Andrew O. Riteris and Spencer B. Michael

ABSTRACT: This disclosure relates to a gear connection which insures movement, in precise parallelism throughout a range of movement, of one generally planar member of substantial planar size with respect to a second parallel planar member of comparable size.

In one specific embodiment, the gear connection is used in electrical discharge machining (hereinafter referred to as EDM) of a hard plate for a die set. The die plate is used as the electrode of the EDM unit and is moved with respect to the hard plate in accordance with the degree of electrical discharge erosion. The electrode is a score rule projecting edgewise from the die plate, and capped by an electrode tip releasably engaged on, and relatively wider than, the score rule edge. Movement of the die plate is guided on posts and the posts are interconnected by gearing on the die plate to maintain parallelism.

In another embodiment, one of the planar members is driven with respect to the other through the gearing connection so that throughout movement the planar members are maintained in parallelism and are thus capable of exerting a uniform pressure throughout the area between their opposed surfaces.

PATENTED FEB 9 1971 3,562,474
SHEET 1 OF 2
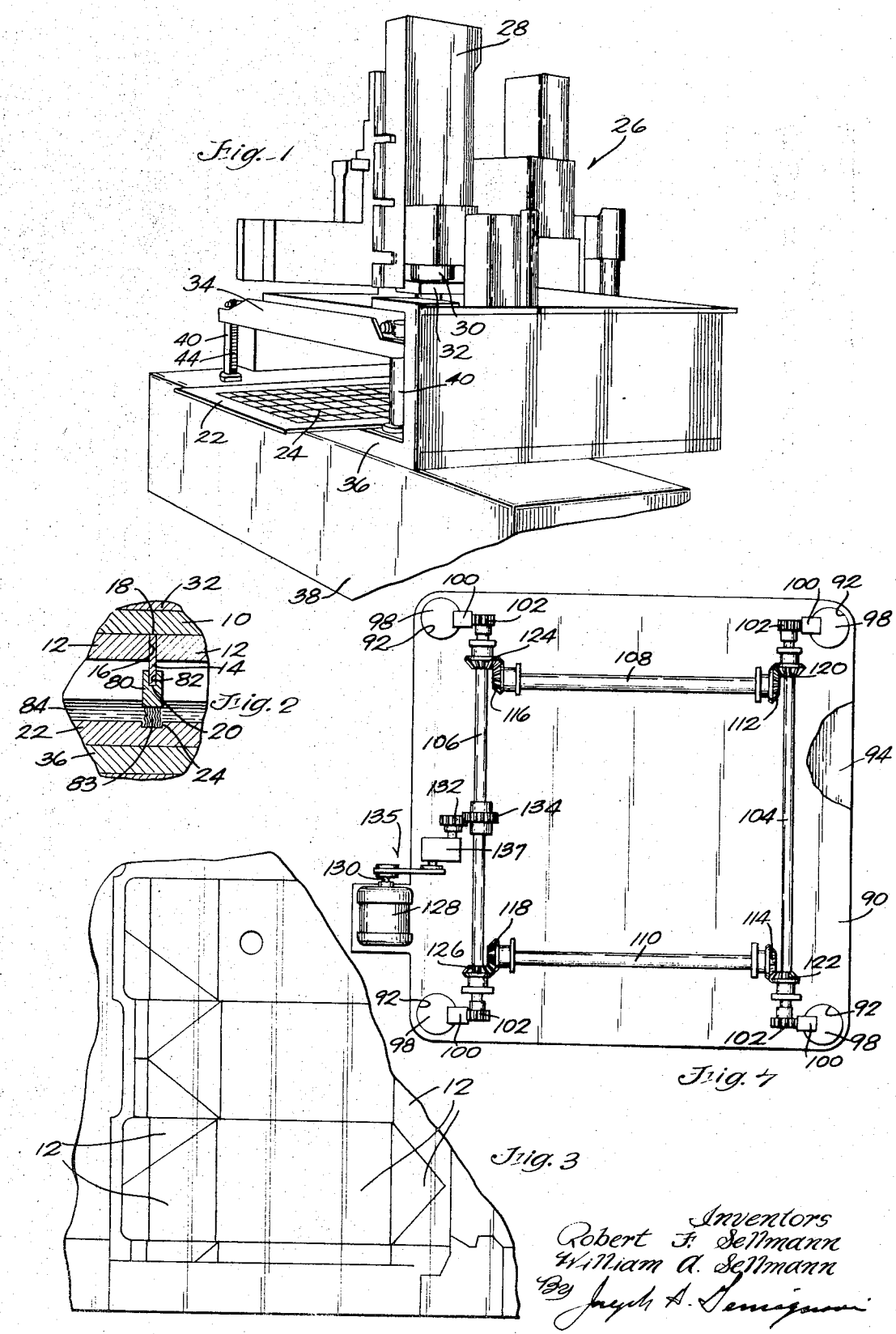

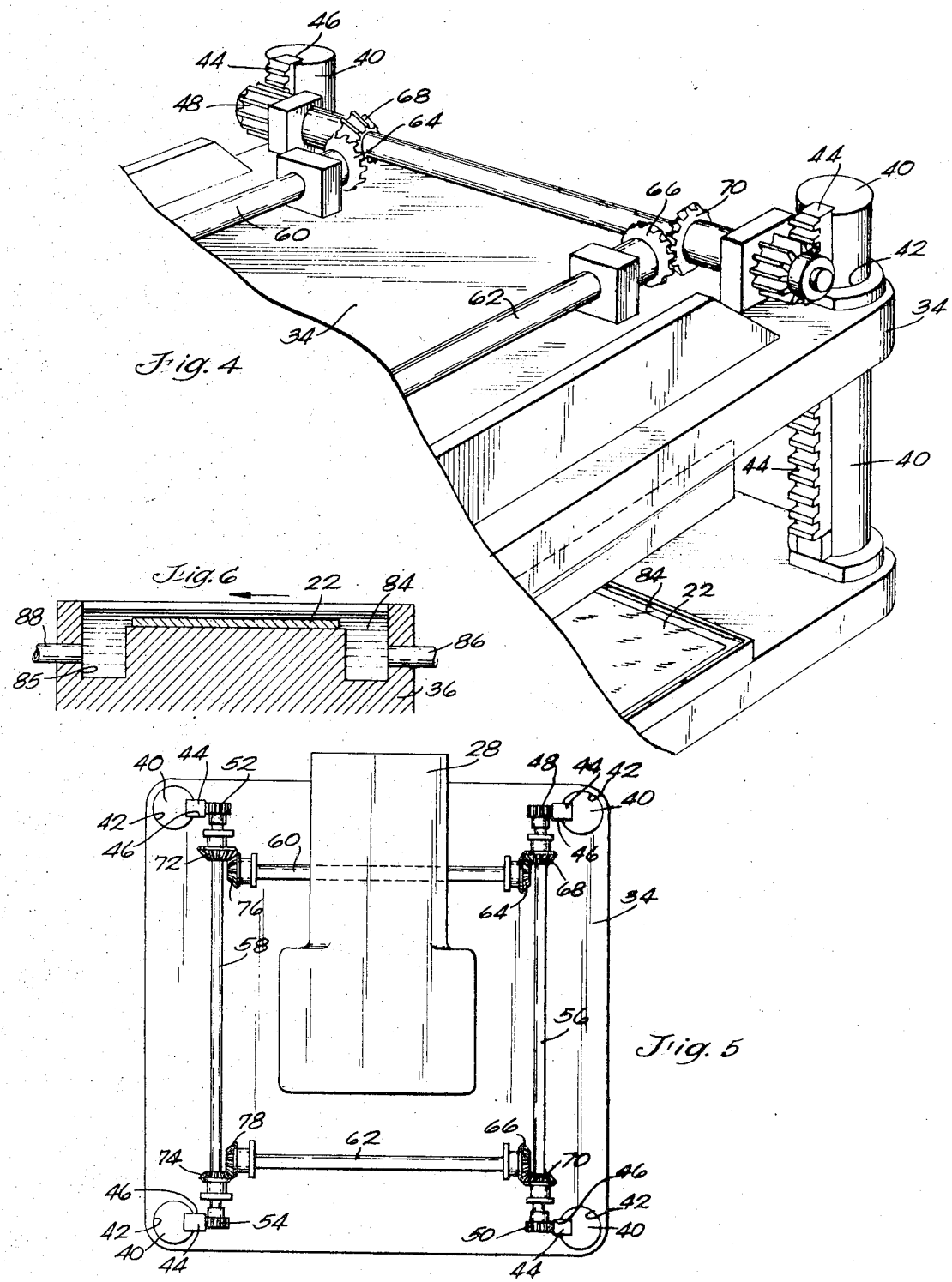

ARRANGEMENT FOR MAINTAINING PARALLELISM BETWEEN RELATIVELY MOVABLE MEMBERS OF AN ELECTRICAL DISCHARGE MACHINING APPARATUS

BACKGROUND OF INVENTION

1. Field of Invention

This invention relates to arrangements for moving parallel work members in parallel relationship and, in a more specific aspect, to the use of such arrangements in an EDM operation.

2. Description of Prior Art

Arrangements for moving parallel members toward and away from each other while maintaining parallelism have been proposed in the past. These have generally been quite complex and were not sufficiently positive to insure precise parallelism throughout the range of movement. Examples of such prior arrangements are counterweights, linkages, and cam systems.

The specific embodiment concerning use in connection with an EDM operation will be discussed in connection with the manufacture of a die set as used in scoring paper products such as milk cartons. In such an environment the male portion of the die set is referred to as the die plate and the female portion as the hard plate. The die plate is built up with projecting score rule and heretofore the commonly accepted manner of machining the hard plate has been by hand engraving (e.g., on a milling machine). It was observed that EDM could be used quite advantageously in this operation by using the die plate as the electrode of the EDM apparatus. In the past EDM has been used where one of two cooperating work pieces is used as the electrode of the unit and works on the other work piece. Because of the nature of the EDM operation, which requires precise control over the distance between the EDM electrode and the work piece, EDM has been limited to machining relatively small parts. More particularly the electrode and work piece must be maintained in exact parallelism throughout the EDM operation and this becomes a major problem when dealing with work pieces of the size of die sets which can involve manipulation of relatively large planar members, for example approximately four feet long by approximately six feet wide. It has been discovered that by providing a positive driving connection between the electrode (die plate) and work piece (hard plate), and which connection has operative engagement at a plurality of points on the electrode, parallelism can be maintained and EDM can be used in manufacturing die sets.

SUMMARY OF INVENTION

This invention relates to an arrangement for moving at least one of two parallel members with respect to the other. This is preferably accomplished by extending a plurality of guide posts between the two members and interconnecting the guide posts with a gear and rack system which is carried partially on the posts and partially on the movable one of the two members. As one member moves with respect to the other, motion is transmitted through the gear connection to spaced points on the movable member to insure parallelism throughout the range of motion.

In accordance with a more specific aspect of this invention, the movable member is in the form of a die plate and moves relative to a work piece. The die plate is the EDM electrode and machines the work piece to from form the hard plate on the die set. For effective EDM operation, the gear and rack arrangement provides a positive driving connection between spaced points on the die plate to insure maintaining the requisite parallelism throughout relative movement. In still more specific aspects of this particular embodiment of the invention (i.e., where the die plate is made up of a system of score rule arranged in predetermined relationship and the hard plate is to carry a score pattern complimentary to the score rule), the projecting ends of the score rule are covered with a releasable electrode attachment thereby protecting the working edge of the score rule from erosion during EDM operation. Generally, a film of a dielectric medium is maintained between the EDM electrode and the work piece for effective arc discharge. In this respect, a positive flow of medium across the face of the hard plate is maintained to flush eroded material from the hard plate so that this material will not interfere with the EDM operation and, in addition, to permit the hard plate score pattern to be made in the form of blind grooves.

An alternative embodiment of this invention contemplates that one of the movable members will be driven with respect to the other through the geared connection. This arrangement affords a relatively simplified construction for maintaining parallel movement and accordingly a uniform distribution of pressure throughout the area between the two relatively movable members.

DESCRIPTION OF DRAWINGS

FIG. 1 is a perspective view of an EDM unit incorporating this invention;

FIG. 2 is a section through a portion of the die plate and hard plate in the EDM unit;

FIG. 3 illustrates a typical score rule pattern for use in a die set for scoring milk cartons or other cartons;

FIG. 4 is a perspective view of a portion of the geared connection;

FIG. 5 is a top plan view of a portion of the EDM unit;

FIG. 6 is a section through the lower portion of the EDM unit illustrating the dielectric medium and its flow in the unit; and FIG. 7 illustrates an alternative embodiment.

DESCRIPTION OF PREFERRED EMBODIMENT

Before specifically describing the illustrated embodiment of this invention, the commonly accepted manner of manufacturing scoring die sets will be described. The die plate is generally built up of a plurality of metal blocks of various sizes and shapes fitted into a holding frame or chase. The blocks do not tightly fill the frame interior but spaces are left between adjacent blocks to receive narrow score rule. The score rule is pressed into the spaces between adjacent blocks and are firmly held in place by friction. The score rule extend above the surface of the blocks and are fitted carefully so that their respective outer edges are parallel with the back face of the die plate and are generally in coplanar relationship with each other. The frame is accurately machined to insure these precise relationships. The other member of the die set is a hard plate or backup plate. The practice heretofore has been to lay out a pattern corresponding to the pattern of the score rule and sink scores into the hard plate along that pattern. This has generally been a manual engraving operation performed, for example, on a milling machine The completed die plate and hard plate provide a die set for scoring various items such as paper stock to be folded into paper cartons, the pattern of the score rule and score on the hard plate corresponding to the necessary folds in the paper carton.

Referring now more specifically to the drawing, the die plate of the die set will be described. The die plate includes a hardened steel frame 10 which is provided with a suitable recess and holds aluminum blocks 12 in the recess. Adjacent blocks 12 are relatively spaced and steel rule 14 is received in slots 16 defined between adjacent blocks. The steel blocks and rule fit tightly in the frame recess and held in assembled relationship by friction. The score rule is carefully fitted in place between the blocks with its inner edge 18 seated against the finished face of the recess and with its outer edge 20 parallel to the recess face. The outer edges of the various steel rule are substantially in relative coplanar relationship. Only typical sections have been shown in FIGS. 2 and 3 for the reason that the arrangement and connection between the score rule and blocks are identical or similar throughout the die plate.

The other portion of the die set is the hard plate 22 and a general illustration of this plate is contained in FIG. 1. The completed hard plate has a scoring pattern 24 engraved in one of its faces, this pattern corresponding to the arrangement of steel rule in the die plate. Since the final scored pattern in the hard plate is identical to the pattern of the score rule it was recognized that an EDM operation using the die plate as the EDM electrode could be used advantageously in manufacturing the hard plate. However, because of the nature of the EDM operation and the size of the die plate and hard plate several problems were presented in attempting to adapt EDM to this use.

EDM is a well-known operation. Basically, it consists of positioning an electrode closely adjacent to, but spaced from, a work piece. The necessary electrical potential is impressed across the gap between the electrode and work piece to arc from the electrode to the work piece. The arc erodes the work piece and is preferably drawn through a suitable dielectric medium such as oil. The electrode is supported on a move movable head, the head containing the necessary electrical apparatus for impressing the arc potential and a servosystem associated with the head to produce head movement in accordance with the degree of erosion and thereby maintain the necessary arcing distance. Since the construction of the EDM unit is well-known it has not been specifically illustrated in the drawings and only a general description will be made. With reference to the drawing, EDM unit 26 includes head 28 which incorporates hydraulic ram 30 to which is connected electrode platen 32. In a conventional manner a hydraulic system (not shown) raises and lowers the ram and correspondingly the electrode platen. Downward movement of the ram and platen is controlled by a convention servosystem (not shown). In accordance with this invention, the die plate of the die set is bolted to the electrode platen and is connected electrically to the electrode platen and/or the electrical circuit of the EDM unit so that it, in effect becomes the electrode of the EDM unit.

Metal support 34 is connected to the EDM electrode platen and supports the die plate throughout its range of movement. Support 34 is connected electrically to the electrode platen and insulating bushings 35 in blocks 37, and also in blocks 39, electrically isolate the support from frame 36. A piece of metal stock which will eventually be hard plate 22 is bolted to lower bed 36 which is supported on machine frame 38. The prearranged score rule of the die plate extends away from the EDM head and toward the work piece. Metal support 34 and the die plate are generally rectangular and are lowered toward the work piece in accordance with the erosion produced by the arc. Because of the precision required in both maintaining a uniform score depth throughout the hard plate and the nature of the EDM operation itself, it is necessary that the die plate and hard plate be parallel and be maintained in parallel relationship throughout the entire range of motion. This invention solves this problem by providing a guide arrangement for the die plate as it moves toward the work piece and also a positive gear connection on the die plate which transmits movement over the die plate to insure movement of the die plate in a preselected orientation with respect to the work piece, i.e. in parallel relationship therewith.

More specifically, four vertical posts, all numbered 40, are fixed to the frame and extend in relative parallel relationship. Posts 40 extend through openings 42 at the corners of support 34 and each post carries a gear rack 44 accommodated in a notch 46 in each opening 42. The gear racks are interconnected by a gear arrangement to insure that the four corners, and hence the entire support and die plate, are lowered in unison and in parallel relation with the work piece.

The gear arrangement includes four pinions 48, 50, 52 and 54 each meshed with a rack 44. Pinions 48 and 50 are supported on shaft 56 and pinions 52 and 54 are supported on shaft 58. Shafts 56 and 58 are interconnected by shafts 60 and 62 and a miter gear arrangement. Miter gears 64 and 66, connected to corresponding ends of shafts 60 and 62, mesh with miter gears 68 and 70 on shaft 56. Similarly, miter gears 72 and 74 are connected to the corresponding ends of shafts 60 and 62. The racks mesh with their respective pinions and the miter gears are also meshed so that movement of one corner of support 34 is transmitted through the gear connection to the remaining corners and insures precise movement of support 34 and the die plate with respect to the work piece.

The die plate is initially positioned by suitable extension of ram 30 and the EDM operation is initiated. The servomechanism then assumes control and maintains the necessary arcing distance between the EDM electrode (the die plate) and the work piece. The geared connection (miter gears, pinion gears, racks and shafts and posts) transmits movement to all four corners of the die plate support thereby insuring maintenance of parallelism between the die plate and the work piece.

Two additional problems are posed in effective use of the EDM operation in this environment. The score rule is intended to function as the male part of the final die set and hence erosion of the outer edge of the score rule can not be tolerated. This problem is solved by providing a releasable electrode extension of the score rule. More particularly, brass strips 80 (see FIG. 2 for typical illustration) are assembled onto all of the outer exposed edges 20 of the score rule. The brass strips have an outwardly opening notch 82 which securely receives the outer edge 20 of the score rule. The brass strip then becomes the arcing tip of the electrode and any erosion which occurs due to arc 83 will be on the brass strip and not on the score rule. The receipt of the score rule into a complementary notch in strip 80 provides a frictional connection which is readily releasable so that at the termination of the EDM operation the brass strip can be removed.

A further advantage is found to evolve from this arrangement. The scoring in the hard plate must be slightly larger than the width of the score rule to effectively score a paper carton. By using a releasable auxiliary tip on the electrode, the tip can readily be made with a larger width than the score rule so that the eroded scoring in the hard plate, which corresponds to the width of the electrode tip, will also be of a greater width than the score rule. This relative width relationship can be seen in FIG. 2.

Another problem encountered in this operation is the build up of eroded material in the scored area of the hard plate. This material is conductive and if allowed to remain in the score can detrimentally effect EDM operation by in effect reducing the distance between conductive material on the hard plate and the arcing electrode. Conventional arrangements for removing the eroded material generally take the form of some type of a flushing opening in the bottom of the eroded hole or groove. This can not be tolerated where the work piece is intended to function as the hard plate of a die set to score paper cartons or the like as the opening can abrade the paper material during scoring. This problem is solved by providing a positive flow of the dielectric medium, the oil, across the surface of the hard plate. As illustrated schematically in FIG. 6, oil 84 flows across the face of the hard plate in the direction of the arrow, and into and through each of the eroded scores. As it passes over the hard plate, the oil picks up and carries the eroded material with it leaving the score area relatively clean. To insure this positive flow of oil, bed 36 includes a reservoir 85 which contains the oil. An inlet 86 is provided at one end of the reservoir and outlet 88 is provided at the opposite end of the reservoir, the flow through opening 88 is made to be just slightly greater than that through inlet 86 so that a positive flow of oil occurs from the inlet to the outlet and this maintains the necessary flow across the face of hard plate 22 positioned in the reservoir.

Observing the effectiveness of the gear arrangement in the just described environment, it was recognized that this same arrangement might have wider application to other uses where it is necessary to move two members toward and away from each other in parallel relationship. For example, the arrangement could be used where two members are intended to function in the nature of a press and it is necessary to maintain uniform pressure throughout the area between the members. An alternative embodiment illustrating this application is shown in FIG. 7. Here, an upper work member 90 is positioned above a lower work member 94. Posts, all numbered 98, extend from member 94 through openings 92 in upper member 90. Each post carries a gear rack 100. A pinion, shaft and miter gear arrangement the same as that described above is supported on member 90 with shaft supported pinions 102 engaging the racks and pinion shafts 104, 106 connected by shafts 108, 110 carrying miter gears 112—118 which mesh with miter gears 120—126 on pinion shafts 104, 106. However, in this alternative the geared connection does not only respond to relative movement between members 90 and 94 but, in addition, provides the medium through which the driving force is transmitted to effect that relative movement.

More particularly, motor 128, which can be a suitable electric motor, is connected to member 90 and has an output shaft 130 connected to pinion shaft 106 through gears 132 and 134. Gear 132 is connected to output shaft 130 through pulley arrangement 135 and gear 134 is supported on pinion shaft 106. A suitable gear reduction 137 can be interposed between gear 132 and motor 128 if desired. The motor, when energized, rotates shaft 104 and this motion is transmitted through the miter gears and pinion gears so that member 90 moves on the racks toward and away from lower member 92. Electrical motor 128 can be reversible or can be utilized in connection with a suitable reversing transmission (not shown). In this manner the upper and lower members are moved toward each other and will maintain a preset parallel relationship throughout that movement to insure uniform pressure throughout the area between the two members.

It will be appreciated that the point of driven movement input can be varied in these embodiments, for example so that it is the posts which are moved with respect to the geared connection. Moreover, this invention is not limited to use in connection with planar members but could be used with specially contoured member with the upper and lower members being complementary to each other.

Although this invention has been illustrated and described in connection with particular embodiments thereof, it will be apparent to those skilled in the art that various changes and modifications may be made therein without departing from the spirit of the invention or from the scope of the appended claims.

We claim:
1. In combination:
a first member;
a second member spaced from and parallel to said first member; member;
means including an EDM unit and operative to move said first member toward and away from said second member;
said first member connected to said EDM unit and comprising a die set member including score rule projecting from said first member and terminating in an edge, said score rule arranged in a predetermined pattern and functioning as the arcing electrode of said EDM unit to score said second member with a pattern corresponding to said score rule pattern;
electrode tips connected to said score rule edge and providing the working edge of said score rule;
gear rack means extending parallel to the direction of movement of said first member with respect to said second member;
gear means;
one of said gear means and gear rack means connected to said first member for movement therewith and the other fixed relative to said second member; and
said gear means including a first set of gear means engaging said gear rack means, first shaft means supporting said first set of gear means for rotation, second shaft means extending between said first shaft means, and a second set of gear means supported on said first and second shaft means and meshed so that said first and second shaft means, said second set of gear means, and said first set of gear means rotate jointly as relative movement between said first and second members occurs.

2. The apparatus of claim 1 wherein:
said first and second members each have a substantial extension in a direction transverse to the direction of relative movement between said first and second members; and
said gear rack means are connected to post means positioned at relatively spaced points over said extension of said first and second members.

3. The apparatus of claim 1 wherein:
said gear rack means are supported on post means arranged in aligned pairs and said shafts extend between said gear rack means of at least one pair of post means.

4. In combination:
a die set member including score rule arranged in a predetermined pattern and projecting from said die set member and terminating in an edge;
electrode tips releasably engaged on said score rule edge and terminating in an edge which is relatively wider than said score rule edge;
a second member spaced from and parallel to said die set member;
selectively operable drive means for moving said die set member toward and away from said second member and including an EDM unit;
said die set member connected to said EDM unit and said score rule functioning as the arcing electrode of said EDM unit with arcing occuring between said score rule and said second member to score said second member with a pattern corresponding to said score rule pattern;
gear rack means extending parallel to the direction of movement of said die set member with respect to said second member;
one of said gear means and gear rack means connected to said die set member for movement therewith and the other fixed relative to said second member; and
said gear means including pinion means engaging said gear rack means, first shaft means supporting said pinion means for rotation, second shaft means extending between said first shaft means, and a plurality of connecting gear means supported on said first and second shaft means and meshed so that said shaft means, connecting gear means, and pinion means are jointly rotatable in response to relative movement between said gear rack means and pinion means.

5. The apparatus of claim 4 including a frame supporting said second member:
means defining a reservoir in said frame;
said second member positioned in said reservoir; and
means for maintaining a positive flow of liquid dielectric medium in a given direction over the surface of said second member which faces said score rule.